(12) United States Patent
Hsu

(10) Patent No.: US 11,004,051 B2
(45) Date of Patent: May 11, 2021

(54) ELECTRONIC DEVICE

(71) Applicant: FLYTECH TECHNOLOGY CO., LTD, Taipei (TW)

(72) Inventor: Wen-Shuo Hsu, Taipei (TW)

(73) Assignee: FLYTECH TECHNOLOGY CO., LTD, Taipei (TW)

( * ) Notice: Subject to any disclaimer, the term of this patent is extended or adjusted under 35 U.S.C. 154(b) by 253 days.

(21) Appl. No.: 16/412,518

(22) Filed: May 15, 2019

(65) Prior Publication Data

US 2020/0320499 A1    Oct. 8, 2020

(30) Foreign Application Priority Data

Apr. 3, 2019  (TW) ................................ 108204145

(51) Int. Cl.
| | |
|---|---|
| G06Q 20/20 | (2012.01) |
| G06K 7/10 | (2006.01) |
| G06K 7/14 | (2006.01) |
| G06K 9/00 | (2006.01) |
| G06Q 20/40 | (2012.01) |
| G06Q 20/34 | (2012.01) |

(52) U.S. Cl.
CPC ....... *G06Q 20/204* (2013.01); *G06K 7/10297* (2013.01); *G06K 7/1413* (2013.01); *G06K 7/1417* (2013.01); *G06K 9/00087* (2013.01); *G06K 9/00288* (2013.01); *G06Q 20/34* (2013.01); *G06Q 20/40145* (2013.01)

(58) Field of Classification Search
None
See application file for complete search history.

(56) References Cited

U.S. PATENT DOCUMENTS 10,366,378 B1 *  7/2019  Han ..................... G06Q 20/202

* cited by examiner

*Primary Examiner* — Paul Danneman
(74) *Attorney, Agent, or Firm* — WPAT, PC

(57) ABSTRACT

An electronic device includes a main body, a reading mechanism and a moving mechanism. The reading mechanism includes a payment object input region. The reading mechanism is located at any side of the main body. The moving mechanism is arranged between the reading mechanism and the main body. In response to an account signal or an external force, the reading mechanism is moved relative to the main body. Consequently, the payment object input region is retracted back or protruded over an outer periphery of the main body for facilitating the user to perform a payment action in a card-inserting manner or a card-swiping manner.

18 Claims, 6 Drawing Sheets

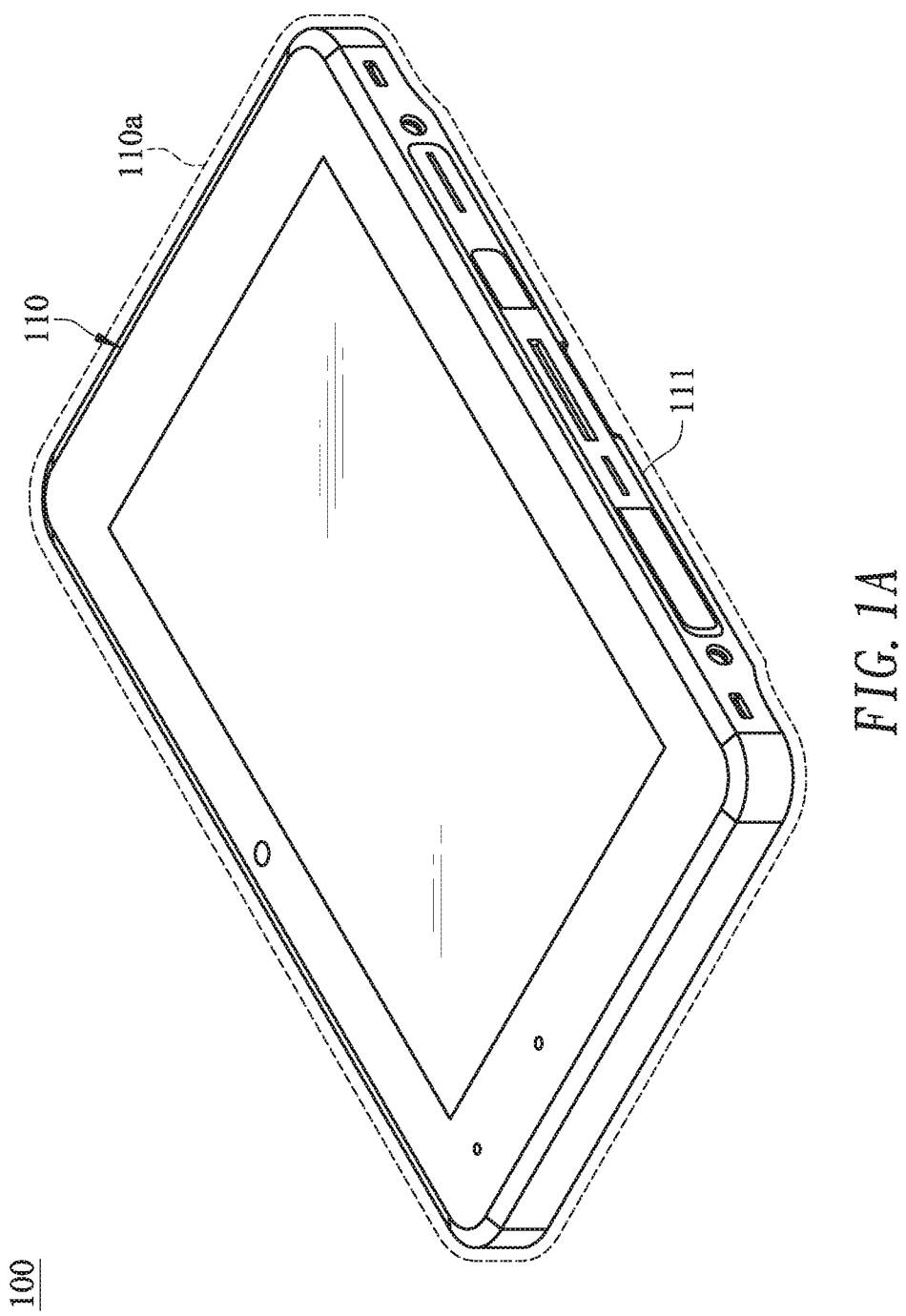

ELECTRONIC DEVICE

FIELD OF THE INVENTION

The present invention relates to an electronic device, and more particularly to an electronic device with a reading mechanism.

BACKGROUND OF THE INVENTION

With the development of modern business, the electronic devices using the point-of-sale information management system are widely used in many commercial sales places. For example, these electronic devices are cash registers (e.g., sales terminals), tablet computers, and the like. For allowing the user to use payment cards more conveniently, the store in the sale terminal needs to have an electronic device with a reading mechanism to implement the modern sale behaviors.

Since the reading methods for different reading mechanisms are different, an electronic device with diverse reading mechanisms is introduced into the market. However, this electronic device is not user-friendly. For example, the checkout area has limited available space to place plural reading mechanisms for facilitating the user to perform the payment action. In addition, the reading mechanisms cannot be movably disassembled or assembled according to the commercial requirements of the store. In addition, the installation position of the payment object input region of the reading mechanism (e.g., an insertion card reader or a magnetic stripe) is usually inconvenient for the consumer to perform the payment action in a card-inserting manner or a card-swiping manner. Since the conventional electronic device with diverse reading mechanisms is not user-friendly, the conventional electronic device cannot meet the commercial requirement and the cost is high.

For overcoming the above drawbacks, there is a need of providing an electronic device for a point-of-sale information management system in order to make good use of the installation space and facilitate the consumer to perform the payment action in a card-inserting manner or a card-swiping manner.

SUMMARY OF THE INVENTION

The present invention provides an electronic device with a reading mechanism and a moving mechanism. By means of the moving mechanism, the reading mechanism is movable relative to a main body of the electronic device. Consequently, a payment object input region can be retracted back or protruded over an outer periphery of the main body.

In accordance with an aspect of the present invention, an electronic device is provided. The electronic device includes a main body, a reading mechanism and a moving mechanism. The reading mechanism includes a payment object input region. A payment object to be read is placed in the payment object input region. The moving mechanism is arranged between the reading mechanism and the main body. In response to an external force, the reading mechanism is moved relative to the main body. Consequently, the payment object input region is retracted back or protruded over an outer periphery of the main body.

In an embodiment, the payment object is a payment card, and the payment object input region includes an insertion slot of an insertion card reader, an insertion slot of a magnetic stripe, or a combination thereof.

In an embodiment, the reading mechanism further includes a near field communication module, a radio frequency identification module, a two-dimensional scanner, a physiological characteristics identifier, or a combination thereof.

In an embodiment, the physiological characteristics identifier is a fingerprint identification sensor or a human face identification sensor.

In an embodiment, the reading mechanism is installed on a rear casing of the main body, and the outer periphery of the main body includes an outer periphery of the rear casing.

In an embodiment, the moving mechanism includes a sliding block and a sliding track, wherein one of the sliding block and the sliding track is installed on the reading mechanism, and the other of the sliding block and the sliding track is installed on the main body. In response to the external force, the sliding block is moved along the sliding track, so that the payment object input region is retracted back or protruded over the outer periphery of the main body.

In an embodiment, the moving mechanism includes a pivotal element, and the pivotal element is arranged between the reading mechanism and the main body. In response to the external force, the reading mechanism is rotated about the pivotal element and the reading mechanism is separated from the main body.

In an embodiment, the electronic device is included in a point-of-sale information management system.

In an embodiment, the moving mechanism includes two docking structures, and the two docking structures are installed on the reading mechanism and the main body, respectively.

In accordance with an aspect of the present invention, an electronic device for a point-of-sale information management system is provided. The electronic device includes a main body and a reading mechanism. The main body includes a first docking structure. The reading mechanism includes a second docking structure, wherein a payment object is read by the reading mechanism. The second docking structure is movably or detachably assembled with the first docking structure, so that the reading mechanism is movable relative to the main body.

In an embodiment, the reading mechanism further includes a payment object input region. The payment object input region includes an insertion slot of an insertion card reader, an insertion slot of a magnetic stripe, or a combination thereof.

In an embodiment, the payment object input region is retracted back or protruded over an outer periphery of the main body in response to an account signal of the electronic device or in response to an external force.

In an embodiment, the outer periphery of the main body includes an outer periphery of the rear casing.

In an embodiment, the reading mechanism further includes a near field communication module, a radio frequency identification module, a two-dimensional scanner, a physiological characteristics identifier, or a combination thereof.

In an embodiment, the physiological characteristics identifier is a fingerprint identification sensor or a human face identification sensor.

In an embodiment, the reading mechanism is installed on a rear casing of the main body through the second docking structure. When the reading mechanism is moved relative to the main body, a portion of the reading mechanism is protruded over an outer periphery of the rear casing.

In an embodiment, the first docking structure is a sliding block, the second docking structure is a sliding track, and the reading mechanism is movable relative to the main body through the sliding block and the sliding track.

In an embodiment, the first docking structure and the second docking structure are collaboratively formed as a pivotal element, and the pivotal element is arranged between the reading mechanism and the main body. When the reading mechanism is rotated about the pivotal element, the reading mechanism is separated from the main body.

The above objects and advantages of the present invention will become more readily apparent to those ordinarily skilled in the art after reviewing the following detailed description and accompanying drawings, in which:

BRIEF DESCRIPTION OF THE DRAWINGS

FIG. 1A is a schematic perspective view illustrating an electronic device according to a first embodiment of the present invention;

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. In the following embodiments and drawings, the elements irrelevant to the concepts of the present invention are omitted and not shown.

Figure 1B:
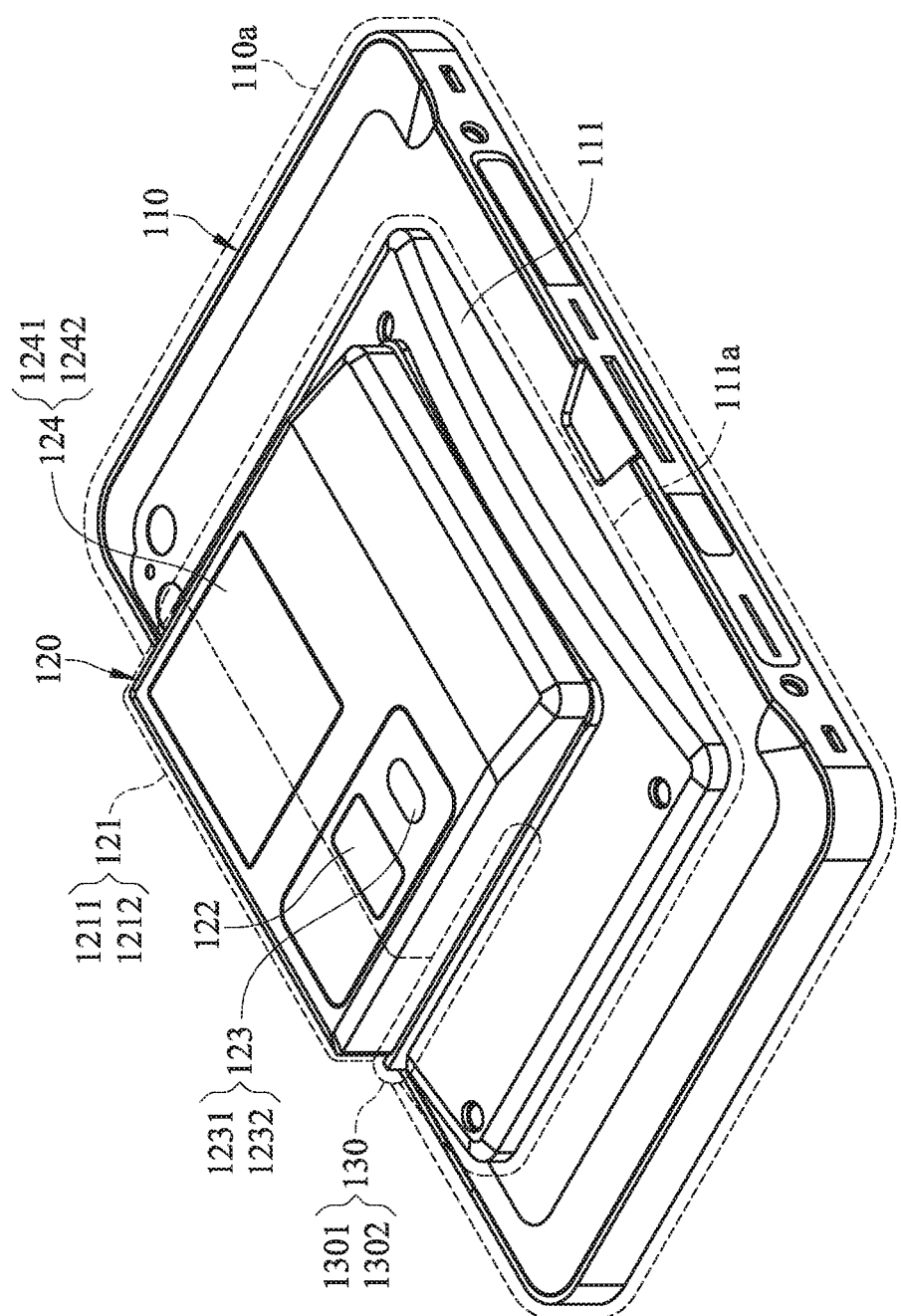
FIG. 1B is a schematic perspective view illustrating the electronic device as shown in FIG. 1A and taken along another viewpoint.
Figure 1C:
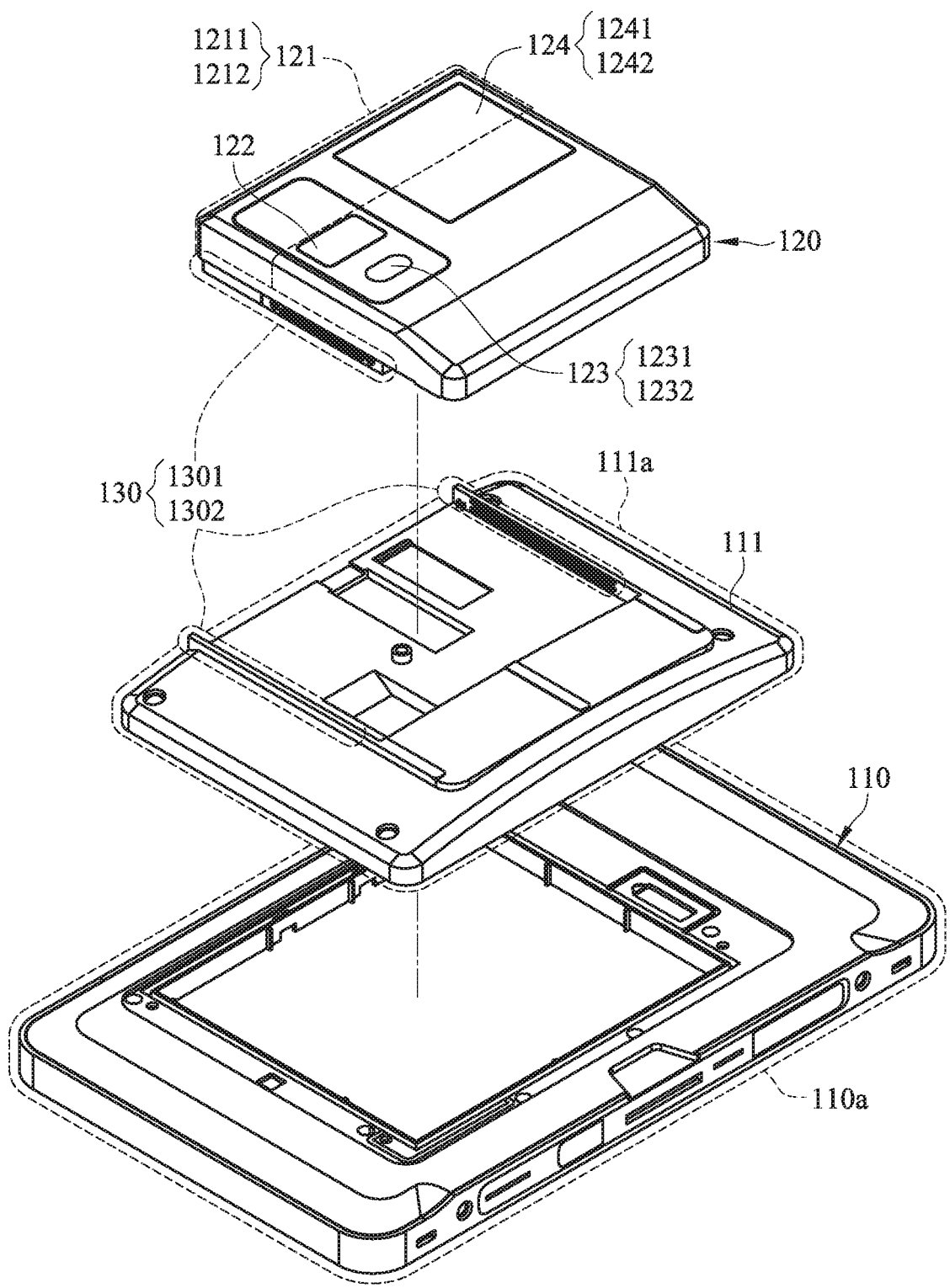
FIG. 1C is a schematic exploded view illustrating the electronic device according to the first embodiment of the present invention.
Figure 1D:
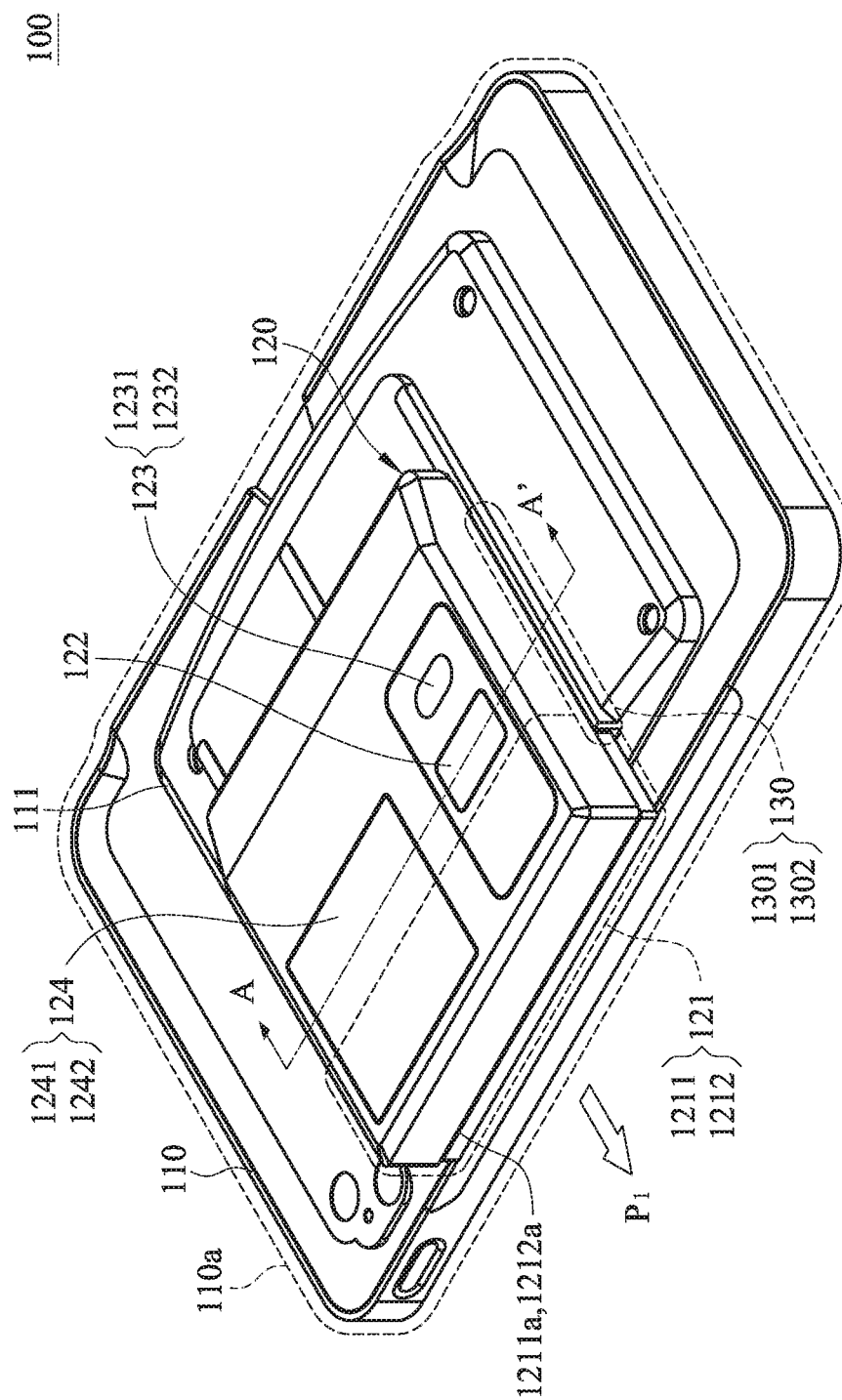
FIG. 1D is a schematic perspective view illustrating the electronic device according to the first embodiment of the present invention, in which the payment object input region is pulled out.
Figure 1E:
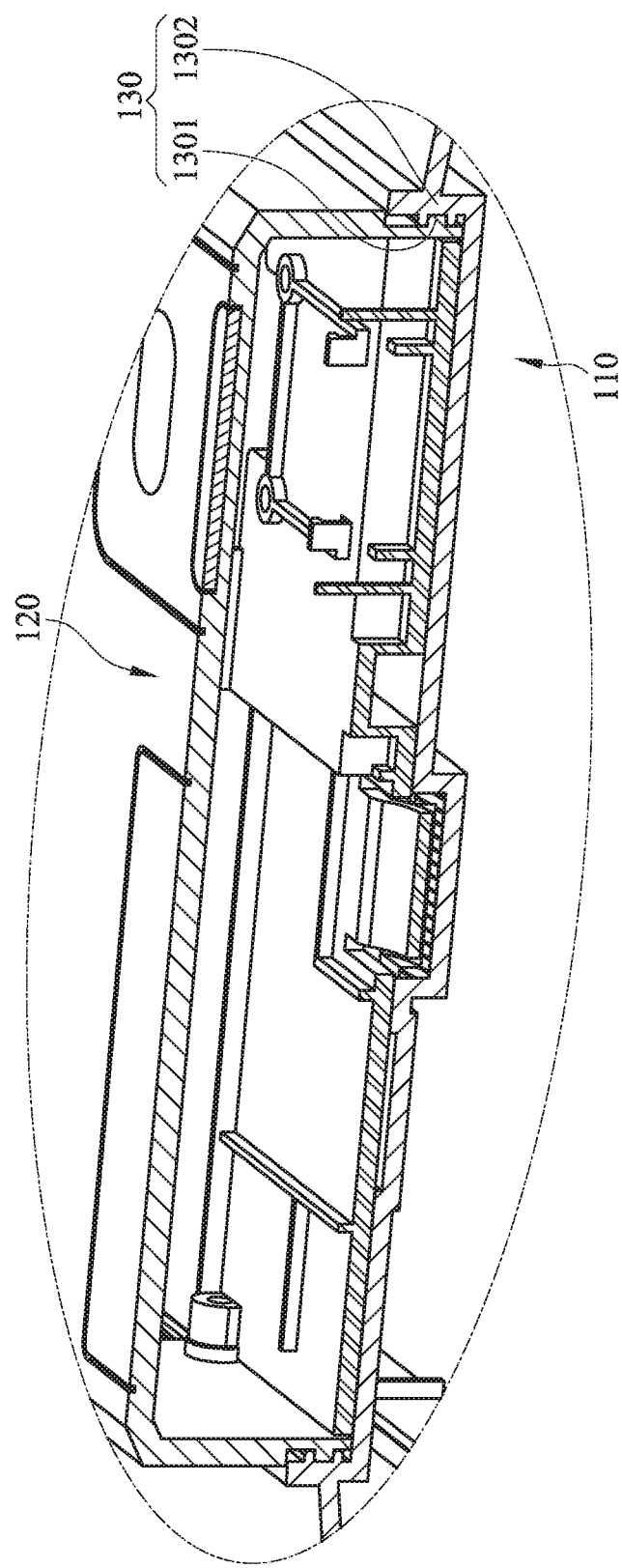
FIG. 1E is a schematic cutaway view illustrating the electronic device as shown in FIG. 1D and taken along the line AA'.

FIG. 1A is a schematic perspective view illustrating an electronic device according to a first embodiment of the present invention. FIG. 1B is a schematic perspective view illustrating the electronic device as shown in FIG. 1A and taken along another viewpoint. FIG. 1C is a schematic exploded view illustrating the electronic device according to the first embodiment of the present invention. FIG. 1D is a schematic perspective view illustrating the electronic device according to the first embodiment of the present invention, in which the payment object input region is pulled out. FIG. 1E is a schematic cutaway view illustrating the electronic device according to the first embodiment of the present invention.

Please refer to FIGS. 1A, 1B and 1C. The electronic device 100 of the present invention is applied to a point-of-sale information management system. The electronic device 100 comprises a main body 110, a reading mechanism 120 and a moving mechanism 130.

The main body 110 comprises a rear casing 111. The rear casing 111 located at a side of the electronic device 100. In this embodiment, the rear casing 111 is assembled with the main body 110 through any appropriate coupling means, and the bottom side of the outer periphery 111a of the rear casing 111 is at the same level with the top side of the outer periphery 110a of the main body 110. Since the rear casing 111 is assembled with the main body 110, the rear casing 111 may be considered as a part of the main body 110. In other words, the outer periphery 111a of the rear casing 111 may be considered as a portion of the outer periphery 110a of the main body 110.

The reading mechanism 120 comprises a payment object input region 121, a two-dimensional scanner 122, a physiological characteristics identifier 123 and a non-contact reader 124. The payment object input region 121, the two-dimensional scanner 122, the physiological characteristics identifier 123 and the non-contact reading module 124 are disposed within the reading mechanism 120 and electrically connected with each other. In response to an account signal (not shown) of the electronic device 100 or an external force P1, a payment action is performed.

In an embodiment, the payment object input region 121 includes an insertion slot 1211a of an insertion card reader, an insertion slot 1212a of a magnetic stripe 1212, or a combination thereof. The two-dimensional scanner 122 is used for reading a linear barcode or a two-dimensional barcode (e.g., QR code). The physiological characteristics identifier 123 is a fingerprint identification sensor 1231 or a human face identification sensor 1232. The non-contact reading module 124 is a near field communication (NFC) module 1241 or a radio frequency identification (RFID) module 1242.

Please refer to FIGS. 1D and 1E. In this embodiment, the moving mechanism 130 comprises a sliding block 1301 and a sliding track 1302. Moreover, one of the sliding block 1301 and the sliding track 1302 is installed on the rear casing 111, and the other of the sliding block 1301 and the sliding track 1302 is installed on the reading mechanism 120. In response to the external force P1, the reading mechanism 120 results in a displacement. That is, the reading mechanism 120 is horizontally movable relative to the rear casing 111. Consequently, the payment object input region 121 can be retracted back or protruded over the outer periphery 111a of the rear casing 111. More especially, the payment object input region 121 can be retracted back or protruded over the outer periphery 110a of the main body 110 along the sliding block 1301 and the sliding track 1302.

In the first embodiment, the sliding block 1301 is installed on the reading mechanism 120, and the sliding track 1302 is installed on the rear casing 111. Due to the sliding block 1301 and the sliding track 1302, the reading mechanism 120 is movably or detachably assembled with the main body 110. Consequently, the reading mechanism 120 is movable relative to the main body 110. When the consumer wants to check out, the payment object input region 121 is protruded over or pushed out of the outer periphery 110a of the main body 110 for facilitating the consumer to complete the payment action in a card-inserting manner or a card-swiping manner. After the payment action is completed, the payment object input region 121 is retracted back or pushed back the outer periphery 110a of the main body 110. Consequently, the payment action is simplified and diversified.

In the above embodiment, the moving mechanism 130 comprises the sliding block 1301 and the sliding track 1302. It is noted that numerous modifications and alterations may be made while retaining the teachings of the invention.

Figure 2:
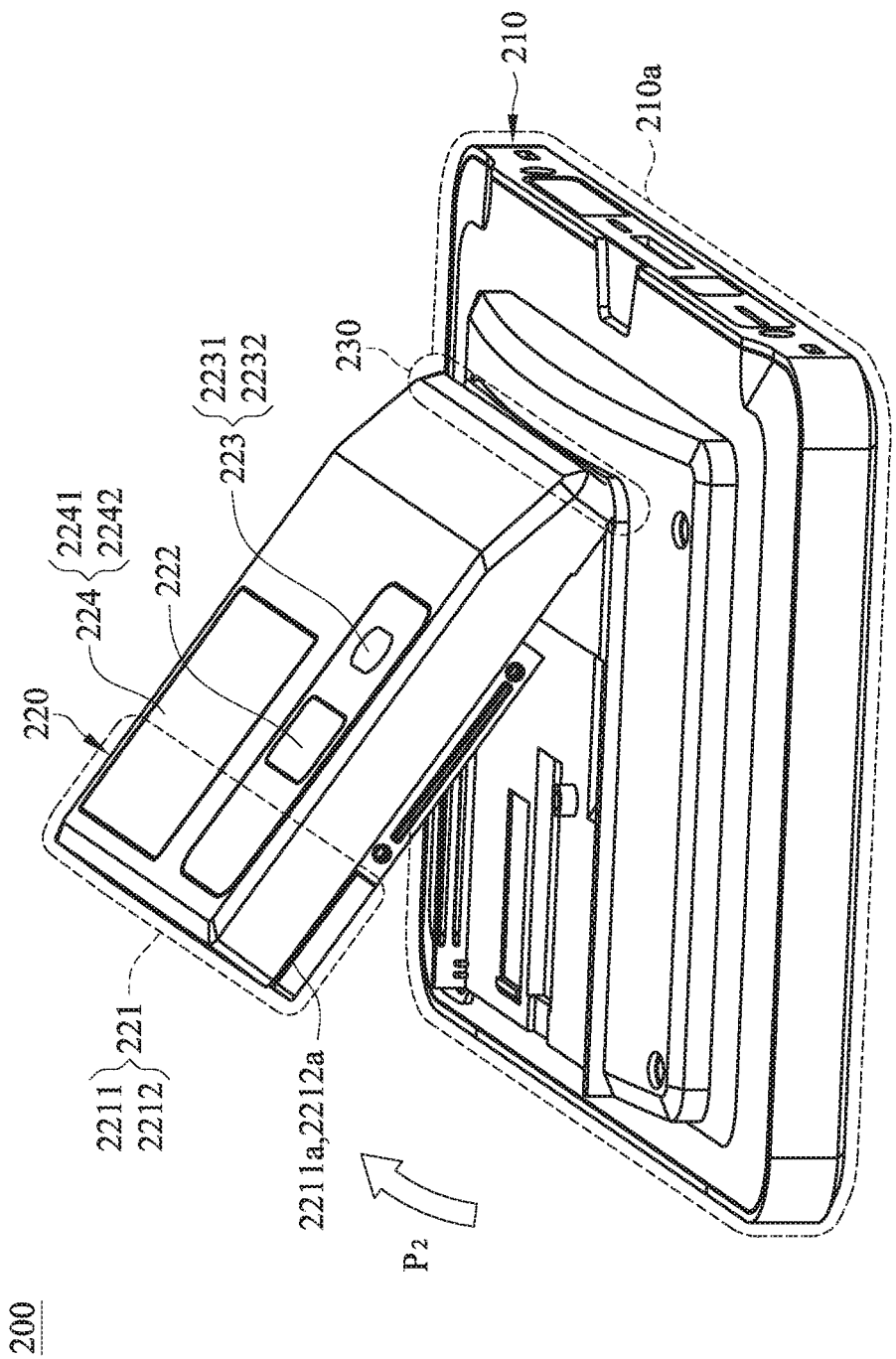
FIG. 2 is a schematic perspective view illustrating an electronic device according to a second embodiment of the present invention.

FIG. 2 is a schematic perspective view illustrating an electronic device according to a second embodiment of the present invention. As shown in FIG. 2, the electronic device 200 comprises a main body 210, a reading mechanism 220 and a moving mechanism 230.

The reading mechanism 220 is installed on a specified surface of the main body 210. For example, the reading mechanism 220 is installed on any lateral surface or a rear surface of the main body 210. The reading mechanism 220 comprises a payment object input region 221, a two-dimensional scanner 222, a physiological characteristics identifier 223 and a non-contact reader 224. Similarly, the payment object input region 221, the two-dimensional scanner 222, the physiological characteristics identifier 223 and the non-contact reading module 224 are electrically connected with each other. For example, the payment object input region 221 includes an insertion slot 2211a of an insertion card reader, an insertion slot 2212a of a magnetic stripe 2212, or a combination thereof. The physiological characteristics identifier 223 is a fingerprint identification sensor or a human face identification sensor. The non-contact reading module 224 is a near field communication (NFC) module or a radio frequency identification (RFID) module.

In comparison with the first embodiment, the structure of the moving mechanism 230 of this embodiment is distinguished. In this embodiment, the moving mechanism 230 includes a pivotal element such as a hinge or a rotating element. The pivotal element 230 is arranged between the reading mechanism 220 and the main body 210. In response to an account signal or an external force P2, the reading mechanism 220 is rotated about the pivotal element 230. Consequently, the reading mechanism 220 is separated from the main body 210 and uplifted.

It is noted that numerous modifications and alterations may be made while retaining the teachings of the invention. The structures and specifications of the above components may be varied according to the practical requirements. As long as the functions of the present invention are achieved, the structures are not restricted.

From the above descriptions, the moving mechanism of the electronic device comprises two docking structures. The two docking structures are arranged between the reading mechanism and the main body of the electronic device. The reading mechanism and the main body can be assembled with each other or disassembled from each other through the two docking structures. In response to an account signal or an external force, the reading mechanism is moved relative to the main body. Consequently, the payment object input region is retracted back or protruded over an outer periphery of the main body for facilitating the user to perform a payment action in a card-inserting manner or a card-swiping manner.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. An electronic device, comprising:
    a main body;
    a reading mechanism comprising a payment object input region, wherein a payment object to be read is placed in the payment object input region; and
    a moving mechanism arranged between the reading mechanism and the main body,
    wherein in response to an external force, the reading mechanism is moved relative to the main body, so that the payment object input region is retracted back or protruded over an outer periphery of the main body.

2. The electronic device according to claim 1, wherein the payment object is a payment card, and the payment object input region includes an insertion slot of an insertion card reader, an insertion slot of a magnetic stripe, or a combination thereof.

3. The electronic device according to claim 1, wherein the reading mechanism further comprises a near field communication module, a radio frequency identification module, a two-dimensional scanner, a physiological characteristics identifier, or a combination thereof.

4. The electronic device according to claim 3, wherein the physiological characteristics identifier is a fingerprint identification sensor or a human face identification sensor.

5. The electronic device according to claim 1, wherein the reading mechanism is installed on a rear casing of the main body, and the outer periphery of the main body includes an outer periphery of the rear casing.

6. The electronic device according to claim 1, wherein the moving mechanism comprises a sliding block and a sliding track, wherein one of the sliding block and the sliding track is installed on the reading mechanism, and the other of the sliding block and the sliding track is installed on the main body, wherein in response to the external force, the sliding block is moved along the sliding track, so that the payment object input region is retracted back or protruded over the outer periphery of the main body.

7. The electronic device according to claim 1, wherein the moving mechanism includes a pivotal element, and the pivotal element is arranged between the reading mechanism and the main body, wherein in response to the external force, the reading mechanism is rotated about the pivotal element and the reading mechanism is separated from the main body.

8. The electronic device according to claim 1, wherein the electronic device is included in a point-of-sale information management system.

9. The electronic device according to claim 1, wherein the moving mechanism comprises two docking structures, and the two docking structures are installed on the reading mechanism and the main body, respectively.

10. An electronic device for a point-of-sale information management system, the electronic device at least comprising:
    a main body comprising a first docking structure; and
    a reading mechanism comprising a second docking structure, wherein a payment object is read by the reading mechanism,
    wherein the second docking structure is movably or detachably assembled with the first docking structure, so that the reading mechanism is movable relative to the main body.

11. The electronic device according to claim 10, wherein the reading mechanism further comprises a payment object input region, wherein the payment object input region includes an insertion slot of an insertion card reader, an insertion slot of a magnetic stripe, or a combination thereof.

12. The electronic device according to claim 11, wherein the payment object input region is retracted back or protruded over an outer periphery of the main body in response to an account signal of the electronic device or in response to an external force.

13. The electronic device according to claim 12, wherein the outer periphery of the main body includes an outer periphery of the rear casing.

14. The electronic device according to claim 10, wherein the reading mechanism further comprises a near field communication module, a radio frequency identification module, a two-dimensional scanner, a physiological characteristics identifier, or a combination thereof.

15. The electronic device according to claim 14, wherein the physiological characteristics identifier is a fingerprint identification sensor or a human face identification sensor.

16. The electronic device according to claim 10, wherein the reading mechanism is installed on a rear casing of the main body through the second docking structure, wherein when the reading mechanism is moved relative to the main body, a portion of the reading mechanism is protruded over an outer periphery of the rear casing.

17. The electronic device according to claim 10, wherein the first docking structure is a sliding block, the second docking structure is a sliding track, and the reading mechanism is movable relative to the main body through the sliding block and the sliding track.

18. The electronic device according to claim 10, wherein the first docking structure and the second docking structure are collaboratively formed as a pivotal element, and the pivotal element is arranged between the reading mechanism and the main body, wherein when the reading mechanism is rotated about the pivotal element, the reading mechanism is separated from the main body.

* * * * *